(12) United States Patent
Foedlmeier

(10) Patent No.: US 7,107,465 B1
(45) Date of Patent: Sep. 12, 2006

(54) PCI BUS INTERFACE CIRCUIT FOR SUPPLYING EITHER A MAIN SUPPLY VOLTAGE OR AN AUXILIARY VOLTAGE TO A PCI PLUG-IN-CARD

(75) Inventor: Dieter Foedlmeier, Altdorf (DE)

(73) Assignee: Infineon Technologies AG, Munich (DE)

( * ) Notice: Subject to any disclaimer, the term of this patent is extended or adjusted under 35 U.S.C. 154(b) by 431 days.

(21) Appl. No.: 10/089,424

(22) PCT Filed: Sep. 22, 2000

(86) PCT No.: PCT/EP00/09317

§ 371 (c)(1),
(2), (4) Date: Jul. 16, 2002

(87) PCT Pub. No.: WO01/24021

PCT Pub. Date: Apr. 5, 2001

(30) Foreign Application Priority Data

Sep. 30, 1999 (DE) ................................ 199 47 017

(51) Int. Cl.
*G06F 1/26* (2006.01)
(52) U.S. Cl. ...................................... 713/300; 713/340
(58) Field of Classification Search ................ 713/300, 713/310, 340; 363/142; 710/305, 313
See application file for complete search history.

(56) References Cited

U.S. PATENT DOCUMENTS

| | | | |
|---|---|---|---|
| 5,598,041 A | 1/1997 | Willis | |
| 5,613,130 A | 3/1997 | Teng et al. | |
| 5,714,809 A | 2/1998 | Clemo | |
| 5,909,583 A | 6/1999 | Hayes et al. | |
| 5,996,035 A | 11/1999 | Allen et al. | |
| 6,008,550 A * | 12/1999 | Dorsey et al. | 307/141 |
| 6,091,617 A * | 7/2000 | Moran | 363/142 |
| 6,560,714 B1 * | 5/2003 | Ho et al. | 713/340 |
| 6,564,333 B1 * | 5/2003 | Ho et al. | 713/340 |

* cited by examiner

*Primary Examiner*—Lynne H. Browne
*Assistant Examiner*—Paul B. Yanchus
(74) *Attorney, Agent, or Firm*—Jenkins, Wilson, Taylor & Hunt, P.A.

(57) ABSTRACT

The invention relates to a PCI bus interface circuit for supplying power to a PCI plug-in card that is connected to a PCI bus. The inventive PCI bus interface circuit comprises a first input (2) for connection to a main voltage supply line of the PCI bus and a second input (3) for connection to an auxiliary voltage supply line of the PCI bus. The circuit further comprises an output (4) for delivering a supply voltage to the PCI plug-in card and a first switching means (6) for switching a main supply voltage supplied at the first input (2) to the output (4) when no auxiliary supply voltage $V_{aux}$ is supplied at the second output (3). A second switching means (7) switches an auxiliary supply voltage $V_{aux}$ supplied at the second input (3) to the output (4) when no main supply voltage $V_{CC}$ is supplied at the first input (2). The inventive circuit further comprises a third switching means (20) that switches the second switching means (7) to switch the auxiliary supply voltage to the output (4) when a main supply voltage is supplied at the first input (2) while an auxiliary supply voltage is simultaneously supplied at the second input (3).

7 Claims, 3 Drawing Sheets

PCI BUS INTERFACE CIRCUIT FOR SUPPLYING EITHER A MAIN SUPPLY VOLTAGE OR AN AUXILIARY VOLTAGE TO A PCI PLUG-IN-CARD

TECHNICAL FIELD

The invention relates to a PCI bus interface circuit for the voltage supply of a plug-in card circuit that can be connected to a PCI bus.

BACKGROUND OF THE INVENTION

The PCI bus system is used primarily in the PC sector. In this case, the majority of PCs have both PCI slots and, for reasons of compatibility, ISA slots.

FIG. 1 shows the basic construction of a PCI bus system. Plug-in cards K1, K2, K3 are connected to the main circuit board or motherboard of the computer via the PCI bus. For this purpose, the plug-in cards K1, K2, K3 are inserted into the PCI slots. The power supply of the plug-in cards K1, K2, K3 is likewise effected via the PCI bus.

Older PCI plug-in cards K1, K2, K3 do not carry out power supply management or power management and are only supplied with a main supply voltage $V_{CC}$. Such PCI plug-in cards are increasingly being replaced by plug-in cards which carry out power supply management in order to save energy. For this purpose, the PCI plug-in cards have to be supplied with a secondary supply voltage or auxiliary supply voltage $V_{aux}$ via the PCI bus. The secondary supply voltage, having a small loading capability, supplies the PCI plug-in cards K1, K2, K3 in a standby mode or is used for the start-up of the computer by the PCI plug-in cards, the PCI plug-in cards being supplied with the main supply voltage $V_{CC}$ after start-up has been effected.

Since not all PCI bus systems are provided with a secondary voltage supply line for supplying the PCI plug-in cards with a secondary or auxiliary supply voltage $V_{aux}$, an interface circuit is provided on the PCI plug-in cards. The interface circuit ensures that the PCI plug-in cards are supplied with the main supply voltage $V_{CC}$ if no auxiliary supply voltage $V_{aux}$ is present. Conversely, when an auxiliary supply voltage $V_{aux}$ is present on the PCI bus, the PCI plug-in card K receives said auxiliary supply voltage for carrying out the power supply management.

FIG. 2 shows an interface circuit according to the prior art.

The interface circuit has two signal inputs E1, E2. The main supply voltage $V_{CC}$ is applied to the input E1, while the input E2 is connected to the auxiliary voltage supply line of the PCI bus. Furthermore, the interface circuit shown in FIG. 2 has an output A for outputting a supply voltage to a circuit situated on the PCI plug-in card. The circuit situated on the plug-in card detects the presence of an auxiliary supply voltage $V_{aux}$, applied to the input E2, via a detection line D. If no auxiliary supply voltage $V_{aux}$ is present at the input E2, the detection device of the circuit situated on the PCI plug-in card is pulled to ground via a pull-down resistor R. As a result, the detection device receives a logically unambiguous signal indicating that no auxiliary supply voltage is present.

The interface circuit according to the prior art, as is shown in FIG. 2, contains two switching devices S1, S2, which are formed by two complementary transistors in the example shown in FIG. 2. In this case, the transistor S1 is an N-channel FET, while the transistor S2 is a P-channel FET. The control terminals of the two transistors S1, S2 are connected to the input E2. If the auxiliary supply voltage $V_{aux}$ is present at the input E2, the FET transistor S1 is turned on or activated, and, at the same time, the FET transistor S2 is turned off or deactivated. As a result, the auxiliary supply voltage for the PCI plug-in card is present at the output A. At the same time, the auxiliary supply voltage $V_{aux}$ present at the input E2 is detected by a voltage detection device, present on the PCI plug-in card, via the signal output D of the interface circuit.

If the main supply voltage $V_{CC}$ is present at the input E1 and if, at the same time, no auxiliary supply voltage $V_{aux}$ is applied to the input E2, the FET transistor S1 turns off and the complementary FET transistor S2 is turned on, with the result that the plug-in card circuit is supplied with the main supply voltage $V_{CC}$ via the output A of the interface circuit.

If the main supply voltage $V_{CC}$ is present at the input E1 and, at the same time, the auxiliary supply voltage $V_{aux}$ is present at the input E2, the FET transistor S1 is turned on and the FET transistor S2 is turned off, with the result that the auxiliary supply voltage $V_{aux}$ is present at the output A of the interface circuit in this case.

The table below shows the various operating cases for the interface circuit according to the prior art, as is shown in FIG. 2.

TABLE 1

(Prior art)

| Operating case | E1 | E2 | S1 | S2 | A |
|---|---|---|---|---|---|
| B1 | 0 | 0 | off | on | 0 |
| B2 | $V_{CC}$ | 0 | off | on | $V_{CC}$ |
| B3 | 0 | $V_{aux}$ | on | off | $V_{aux}$ |
| B4 | $V_{CC}$ | $V_{aux}$ | on | off | $V_{aux}$ |

The interface circuit according to the prior art as shown in FIG. 2 has the disadvantage, however, that it does not ensure a reliable voltage supply of the PCI plug-in card circuit in every operating case. In PCI bus systems, the main supply voltage $V_{CC}$ and also the auxiliary supply voltage $V_{aux}$ are 3.3 volts in each case. The supply voltage of the circuit situated on the plug-in card should never be below 3 volts. Therefore, it must be ensured that, at the output A of the interface circuit, given the presence of a supply voltage on the PCI bus, likewise at least an output voltage of 3 volts is output to the PCI plug-in card K.

In operating case B3 (see table), the auxiliary supply voltage $V_{aux}$ is present at the input E2, while no main supply voltage $V_{CC}$ is present at the input E1. In this case, the FET transistor S1 is turned on and the FET transistor S2 turns off. The FET transistor S1 acts like a forward-biased diode across which a diode forward voltage of about 0.7 volt is dropped. Given an auxiliary supply voltage of 3.3 volts, only a supply voltage of about 2.6 volts thus passes to the output A of the interface circuit according to the prior art. In other words, this supply voltage is clearly below the required 3 volts which are necessary for the reliable voltage supply of the circuit on the PCI plug-in card.

SUMMARY OF THE INVENTION

The object of the present invention, therefore, is to provide a PCI bus interface circuit which ensures, in every operating case, a reliable voltage supply of the PCI plug-in card circuits connected to the PCI bus.

This object is achieved according to the invention by means of a PCI bus interface circuit with the features specified in patent claim 1.

Further advantageous refinements of the PCI bus interface circuit according to the invention are specified in the subclaims.

The invention provides a PCI bus interface circuit for the voltage supply of a PCI plug-in card that can be connected to the PCI bus, having:

a first input for connection to a main voltage supply line of the PCI bus;

a second input for connection to an auxiliary voltage supply line of the PCI bus;

an output for outputting a supply voltage to the PCI plug-in card;

a first switching device for switching a main supply voltage that is present at the first input to the output if no auxiliary supply voltage is present at the second input;

a second switching device for switching an auxiliary supply voltage that is present at the second input to the output if no main supply voltage is present at the first input; and having a third switching device, which, given the simultaneous presence of a main supply voltage at the first input and an auxiliary supply voltage at the second input, drives the second switching device for switching the auxiliary supply voltage through to the output.

In a preferred development of the interface circuit according to the invention, the switching devices are semiconductor switching devices.

In a preferred further embodiment of the interface circuit according to the invention, the switching devices are transistors each having a control terminal.

The third switching device is preferably complementary to the first and second switching devices.

In a further preferred development of the interface circuit according to the invention, the control terminal of the first transistor is connected to the second input and the control terminal of the second transistor is connected to the first input.

In accordance with a preferred development, the control terminal of the third transistor is connected to the second input, the third transistor, given the presence of an auxiliary supply voltage at the second input, being turned on and connecting the control terminal of the second transistor to a predetermined voltage potential, in order that the second transistor switches the auxiliary supply voltage through to the output.

Respective current limiting resistors are preferably connected upstream of the control terminals of the transistors.

In a further preferred development, the switching point of the third switching device is adjustable by means of a voltage divider.

In a further preferred development, provision is made of a detection line, connected to the second input, for the detection of the auxiliary supply voltage by a voltage detection device on the PCI plug-in card.

The switching devices preferably have a small voltage drop in the turned-on state.

In a preferred embodiment, the switching devices have a voltage drop of less than 0.1 volt in the turned-on state.

Preferably, the main supply voltage and also the auxiliary supply voltage are nominally 3.3 volts in each case.

BRIEF DESCRIPTION OF THE DRAWINGS

Furthermore, a preferred embodiment of the interface circuit according to the invention is described with reference to the accompanying drawings in order to elucidate features that are essential to the invention.

In the figures.

DETAILED DESCRIPTION OF THE INVENTION

Figure 1:
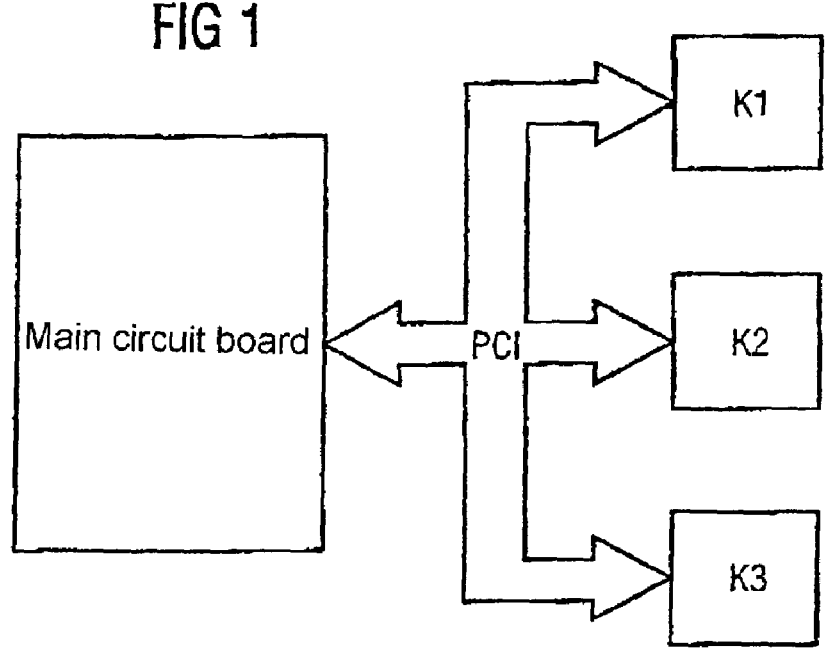
FIG. 1 shows a block diagram for illustrating a conventional PCI bus system.
Figure 2:
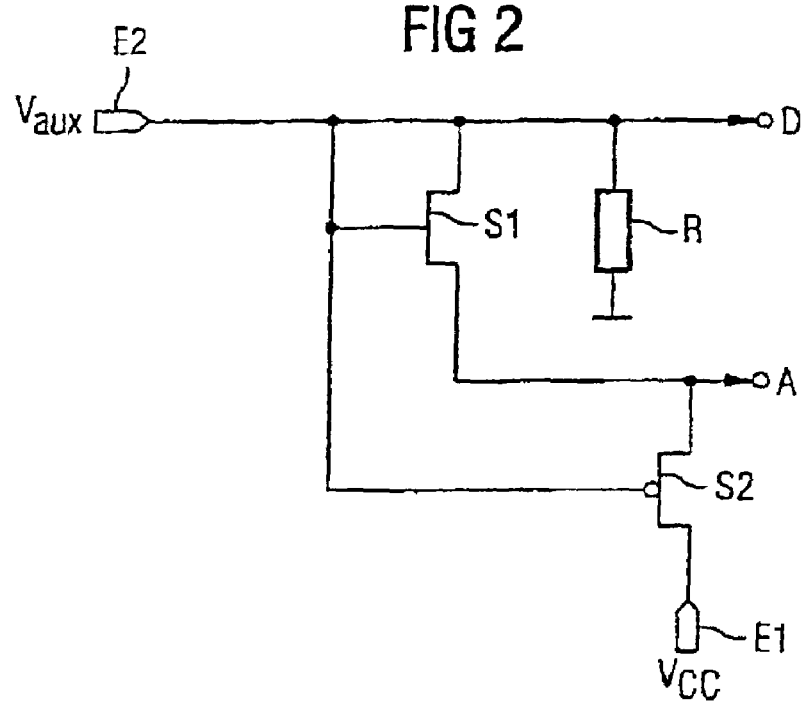
FIG. 2 shows a PCI bus interface circuit according to the prior art.
Figure 3:
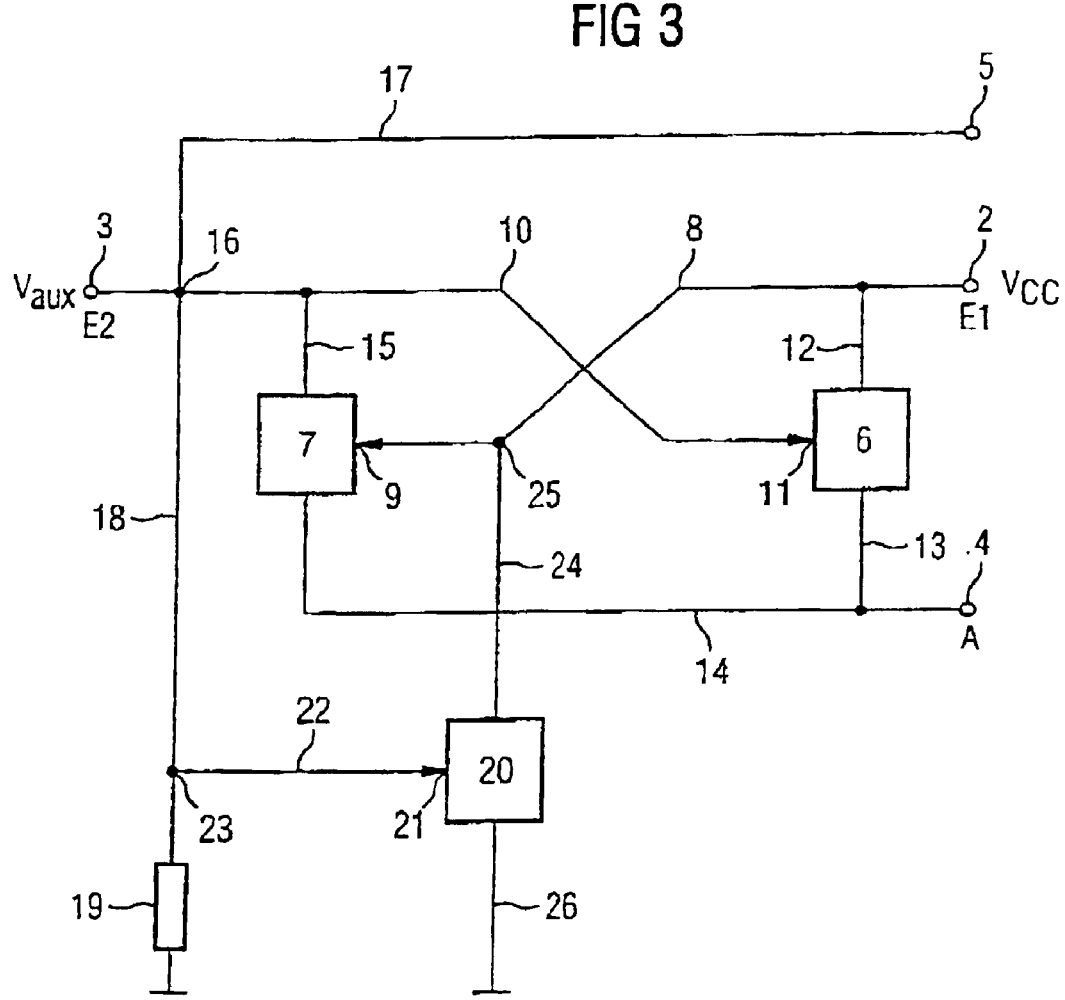
FIG. 3 shows a PCI bus interface circuit according to the invention.

As can be seen from FIG. 3, the PCI bus interface circuit 1 according to the invention has a first input 2 for connection to a main voltage supply line of a PCI bus and also a second input 3 for connection to an auxiliary voltage supply line of the PCI bus. Furthermore, provision is made of an output 4 for outputting a supply voltage to a PCI plug-in card. Moreover, the interface circuit according to the invention has an output terminal 5 for the connection of a voltage detection device on the PCI plug-in card, which can detect an auxiliary supply voltage $V_{aux}$ that is present at the input terminal 3.

The interface circuit contains a first controllable switching device 6 for switching the main supply voltage $V_{CC}$ that is present at the first input 2 through to the output 4. Furthermore, the interface circuit contains a second switching device 7 for switching an auxiliary supply voltage that is present at the second input 3 through to the output 4. The input 2 is connected via an internal line 8 to a control terminal 9 of the second switching device 7, while the second input 3 is connected via an internal line 10 to a control terminal 11 of the first switching device 6. In a manner dependent on the signal present at the control terminal 11, the first switching device 6 switches the main supply voltage $V_{CC}$ that is present at the input 2 via lines 12, 13 onto a line 14, which is connected to the output 4. In a manner dependent on the signal present at the control terminal 9, the second switching device 7 switches, via a line 15, an auxiliary supply voltage $V_{aux}$ that is present at the second input 3 onto the line 14 for outputting via the output terminal 4.

The internal line 10 connected to the input 3 has a junction node 16, at which a line 17 is routed to the output terminal 5 and at which, moreover, a line 18 branches off, which is grounded via a resistor 19. A third switching device 20 with a control terminal 21 is controlled via a control line 22 connected to a branch-off node 23 on the line 18. The third switching device 20 is connected to the line 8 via a line 24 at a junction node 25. Furthermore, the third switching device 20 is grounded via a line 26.

The first switching device 6 switches the main supply voltage that is present at the first input 2 to the output 4 if no auxiliary supply voltage $V_{aux}$ is present at the second input 3. If an auxiliary supply voltage $V_{aux}$ is not present, the voltage potential at the node 16 is pulled to ground via the pull-down resistor 19 and drives the first switching device 6 via the line 10 and the control terminal 11 in such a way that the main supply voltage $V_{CC}$ present on the line 12 is switched through onto the line 13 and thus passes via the line 14 to the voltage supply output 4.

The second switching device 7 switches an auxiliary supply voltage that is present at the second input 3 to the output 4 if no main supply voltage $V_{CC}$ is present at the first input 2. In the case of a low-level main supply voltage $V_{CC}$, the second switching device 7 is driven via the line 8 and the control terminal 9 in such a way that it switches the auxiliary supply voltage $V_{aux}$ that is present on the line 15 through to the line 14 for outputting via the output 4.

Given the simultaneous presence of a main supply voltage $V_{CC}$ at the first input 2 and an auxiliary supply voltage $V_{aux}$ at the second input 3, the third switching device 20 is driven via the lines 18, 22 in such a way that it through-connects the node 25 to ground via the lines 24, 26. As a result of the low potential present at the node 25, the second switching device 7 is driven for switching the auxiliary supply voltage present on the line 15 through to the line 14, with the result that the auxiliary supply voltage $V_{aux}$ is present at the output 4 of the interface circuit. At the same time, the high potential present at the control terminal 11 of the first switching device 6 turns the switching device 6 off.

The table below shows the various operating cases of the interface circuit according to the invention.

TABLE 2

| Operating case | E1 | E2 | S6 | S7 | S20 | A |
|---|---|---|---|---|---|---|
| B1 | 0 | 0 | on | on | off | 0 |
| B2 | $V_{CC}$ | 0 | on | off | on | $V_{CC}$ |
| B3 | 0 | $V_{aux}$ | off | on | on | $V_{aux}$ |
| B4 | $V_{CC}$ | $V_{aux}$ | off | on | on | $V_{aux}$ |

Figure 4:
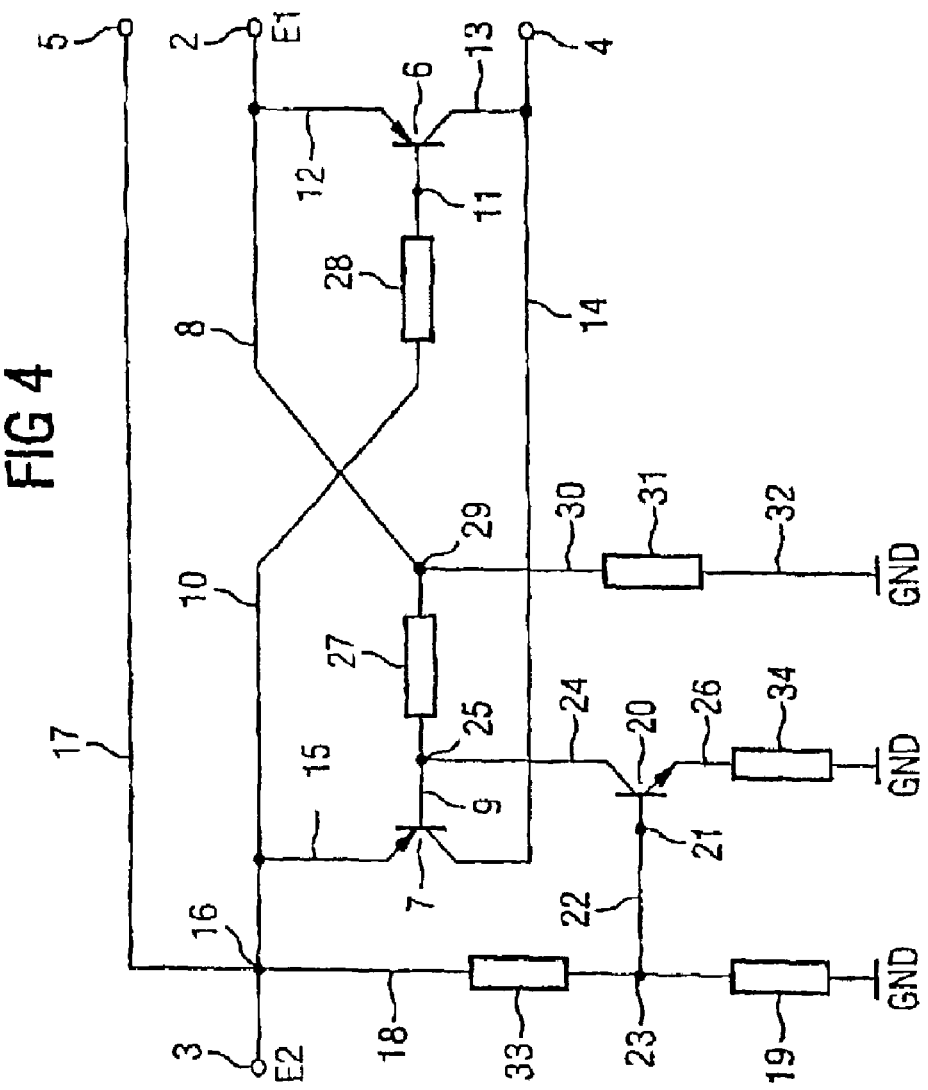
FIG. 4 shows a preferred embodiment of the PCI bus interface circuit according to the invention.

FIG. 4 shows a preferred embodiment of the interface circuit according to the invention. In this case, identical reference symbols specify structural parts corresponding to those in FIG. 3.

The switching devices 6, 7, 20 are preferably designed as semiconductor switches. In this case, the semiconductor switches are preferably transistors which are controlled by a control terminal 9, 11, 21.

As can be seen from FIG. 4, the third switching device, as NPN transistor 20, is complementary to the PNP transistors 6, 9 which form the first and second switching devices. As illustrated in FIG. 4, the semiconductor switches 6, 7, 20 may be constructed as bipolar transistors or, as an alternative, as field-effect transistors. Respective current limiting resistors 27, 28 are connected upstream of the control terminals 9, 11 of the two PNP transistors 7, 6. A further resistor 31 is connected to a branch-off node 29 via a line 30, said further resistor being grounded via a line 32. The resistor 31 serves as pull-down resistor which pulls the control terminal 9 of the transistor 7 to ground in the absence of a main supply voltage $V_{CC}$ at the first input 2, with the result that the transistor 7 reliably switches an auxiliary voltage present at the second input 3 through to the output 4.

A resistor 33, which is preferably connected into the line 18, forms, together with the resistor 19, a voltage divider by means of which the switching point of the third switching device 20 is adjustable. An additional resistor 34 connected into the line 26 likewise serves for current limiting.

In the turned-on state, the semiconductor switching devices 6, 7, 20 operate in the low-impedance region, in which a voltage drop of less than 0.1 volt occurs.

The low-impedance region is the saturation region in bipolar transistors, while the low-impedance region is the triode region in field-effect transistors. Thus, a voltage drop of less than 0.1 volt is produced between the lines 12, 13 when the first switching device 6 turns on, and a voltage drop likewise of less than 0.1 volt is produced between the lines 15 and 14 when the switching device 7 turns on. If the auxiliary supply voltage at the second input 3 is nominally 3.3 volts, which may fluctuate in a range from 3.1 volts to 3.5 volts, in operating cases B3, B4 (see table 2) a supply voltage of about nominally 3.2 volts reaches the output, which supply voltage is at least 3 volts and thus satisfies the required 3 volts for the reliable voltage supply of the circuit situated on the plug-in card. Given the absence of an auxiliary supply voltage and presence of a main supply voltage at the first input 2 of the interface circuit (operating case B2 in table 2), the switching device 6 is turned on, a voltage drop of 0.1 volt being produced, with the result that a main supply voltage likewise of about 3.2 volts is present at the output 4. Thus, in every operating case, the interface circuit according to the invention ensures a reliable voltage supply of the circuit situated on the PCI plug-in card via the output 4.

A further advantage of the interface circuit according to the invention is that reliable decoupling of the auxiliary supply voltage $V_{aux}$ and the main supply voltage is ensured. When a main supply voltage $V_{CC}$ occurs at the first input 2 of the interface circuit and, at the same time, no auxiliary supply voltage $V_{aux}$ is present at the second input 3 (see table 2, operating case B2), a high potential is present at the potential node 25, with the result that a reverse-biased PN junction is present between the control terminal 9 and the line 15, and prevents the main supply voltage present at the input 2 from coupling onto the line 15. This ensures that there is no feedback of main supply voltage $V_{CC}$ via the line 15, the line 10, the node 16 and via the line 17 to the output terminal 5. As a result, an auxiliary supply voltage that is not actually present cannot be erroneously detected by the voltage detection device situated on the plug-in card.

The resistors 19, 33 together form a voltage divider for setting the switching point of the switching device 20. The resistors 19, 33 are preferably variable resistors, so that the switching point of the switching device 20 is likewise adjustable.

In an alternative embodiment, the switching devices 7, 12, 20 may be constructed using discrete components, such as relay circuits for example.

LIST OF REFEERENCE SYMBOLS

1 PCI bus interface circuit
2 First input
3 Second input
4 Output
5 Detection output
6 First switching device
7 Second switching device
8 Line
9 Control terminal
10 Line
11 Control terminal
12 Line
13 Line
14 Line
15 Line
16 Node
17 Line
18 Line
19 Resistor
20 Third switching device
21 Control terminal
22 Line
23 Node
24 Line 25 Node
26 Line
27 Current limiting resistor
28 Current limiting resistor
29 Node
30 Line
31 Resistor
32 Line
33 Resistor
34 Resistor

The invention claimed is:

1. A PCI bus interface circuit for the voltage supply of a PCI plug-in card that can be connected to a PCI bus, the PCI bus interface circuit comprising:
    a first input for connection to a main voltage supply line of the PCI bus;
    a second input for connection to an auxiliary voltage supply line of the PCI bus;
    an output for outputting a supply voltage to the PCI plug-in card;
    a first transistor for switching a main supply voltage that is present at the first input to the output, the first transistor having a first control terminal connected to the second input so that the first transistor switches the main supply voltage that is present at the first input to the output if no auxiliary supply voltage $V_{aux}$ is present at the second input;
    a second transistor for switching an auxiliary supply voltage $V_{aux}$ that is present at the second input to the output, the second transistor having a second control terminal connected to the first input so that the second transistor switches the auxiliary supply voltage that is present at the second input to the output if no main supply voltage $V_{CC}$ is present at the first input; and
    a third transistor, which, given the simultaneous presence of a main supply voltage $V_{CC}$ at the first input and an auxiliary supply voltage $V_{aux}$ at the second input, drives the second transistor for switching the auxiliary supply voltage $V_{aux}$ through to the output, the third transistor being constructed complementarily with respect to the first and second transistors and having a third control terminal connected to the second input so that the third transistor, when an auxiliary supply voltage is applied to the second input, turns on and connects the second control terminal to a specific voltage potential with the result that the second transistor switches through the auxiliary supply voltage to the output.

2. The interface circuit as claimed in claim 1, wherein respective current limiting resistors are connected upstream of the control terminals of the first and second transistors.

3. The interface circuit as claimed in claim 1, wherein the switching point of the third transistor is adjustable by means of a voltage divider.

4. The interface circuit as claimed in claim 1, wherein provision is made of a detection line, connected to the second input, for outputting the auxiliary supply voltage to a voltage detection device within the circuit situated on the plug-in card.

5. The interface circuit as claimed in claim 1, wherein the transistors have a small voltage drop in the turned-on state.

6. The interface circuit as claimed in claim 5, wherein the transistors have a voltage drop of less than 0.1 volt in the turned-on state.

7. The interface circuit as claimed in claim 1, wherein the main supply voltage and the auxiliary supply voltage are in each case 3.1 volts to 3.5 volts.

* * * * *